Aug. 30, 1960 M. PLETMAN 2,950,534
DENTAL INSTRUMENT
Filed June 9, 1958

INVENTOR
MAX PLETMAN
BY Beale & Jones
ATTORNEYS

2,950,534
DENTAL INSTRUMENT

Max Pletman, 30 S. Broadway, Yonkers, N.Y.

Filed June 9, 1958, Ser. No. 740,933

5 Claims. (Cl. 32—40)

My invention is directed to a dental instrument for use by the dentist to protect a tooth adjacent to one in which the dentist is preparing a dental cavity.

With the advent of higher speeds for rotating burrs it is important that damage not be done by the burr to an adjacent tooth to one in which the dentist is preparing a dental cavity.

An object of my invention is to provide an instrument having a handle on which is mounted a flexible blade that may be easily inserted between two teeth for protecting the adjacent tooth while operating on a tooth such as with a high-speed rotating burr.

A further object of my invention is to provide an instrument having an easily manageable handle with a detachable blade of flexible steel that extends in the general longitudinal axis of the handle at the anterior end and has a width equivalent to about the height of a posterior tooth above the gum line.

A still further object of my invention is to provide a dental instrument having a handle with a hand grasp portion, a narrow shank at the anterior end that has fixed thereto a flat member having a loop-like portion forming a narrow slot to receive a flat flexible blade that protrudes anteriorly from the flat member and which is prevented from sliding by securing means on the member, yet permits detachment and replacement.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings in which.

Throughout the description like reference numerals refer to similar parts.

Figure 1:
Fig. 1 is a top plan view of the instrument.

The instrument utilizes a typical handle 10 similar to that of a dental mirror handle having polygonal sides joining with a reduced portion at 11 that further joins with an elongated shank portion 12 at the right or anterior end as illustrated. The anterior end of shank 12 is slotted in a transverse manner at 12a and has a protruding underneath portion 12b. Received in the slotted portion 12a and lying in abutting relation to the flat top of protruding portion 12b at 12c is a flat member generally indicated at 13 whose posterior end is received in slot 12a and fixed therein and to the protruding portion 12b such as by silver soldering.

Figure 3:
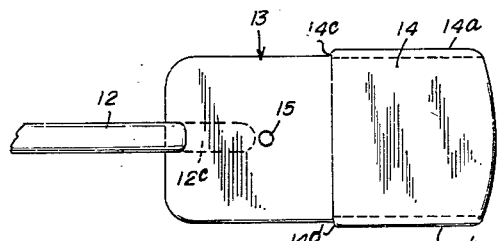
Fig. 3 is a top plan view on an enlarged scale of the anterior end of the instrument but having the blade detached.
Figure 4:
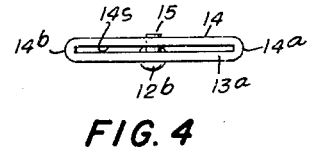
Fig. 4 is a right hand end view of Fig. 3 showing the slot to receive the blade.
Figure 5:
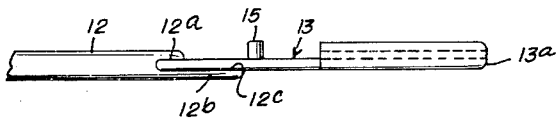
Fig. 5 is a side elevation view of the portion of the instrument depicted in Fig. 3.
Figure 6:
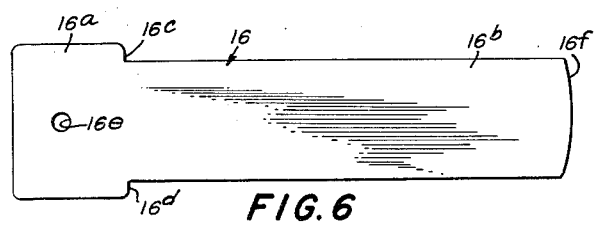
Fig. 6 is a plan view of the blade detached on a scale of the instrument portion shown in Figs. 3, 4 and 5.

The flat member 13 is about ½ inch long, ⁵⁄₁₆ inch wide and ¹⁄₃₂ inch thick of suitable instrument metal such as rigid, stainless steel. The anterior end is formed with a broad arcuate curve as at 13a. Over the anterior half of the flat member 13 there is secured a flat loop-like metal piece 14 that is spaced from the flat member 13 by an amount slightly greater than the thickness of piece 16 to form a narrow slot 14s. The sides of 14 are bent down at each edge 14a and 14b so that they abut the adjacent edges of the flat member 13 to which it is neatly joined as by silver soldering or otherwise. The anterior edge of 14 is formed in curved manner corresponding to the end 13a therebelow. By this arrangement there is formed a slight protruding shoulder at each posterior corner of loop-like metal piece 14 as at 14c and 14d, best shown in Fig. 3.

Attached to extend upwardly from flat member 13 on the same side thereof as member 14 is a relatively small cylindrical post 15 positioned posteriorly and in spaced relation to the loop-like member 14.

Received in sliding manner within slot 14 is a detachable flexible blade member generally indicated at 16 of about .003 inch gauge steel. This blade 16 is about 1⅛ inches long, about ¼ inch wide throughout the major portion of its length to snugly fit slot 14s while the posterior end portion at 16a is slightly wider than the anterior portion 16b. Shoulders 16c and 16d at each side between portions 16a and 16b thereof cooperate with shoulders 14c and 14d respectively on member 14 to prevent relative forward movement while an aperture 16e extending transversely down through posterior portion 16a in alignment with post 15 serves as a securing means for the blade 16 to prevent sliding movement back out of slots 14s.

Figure 7:
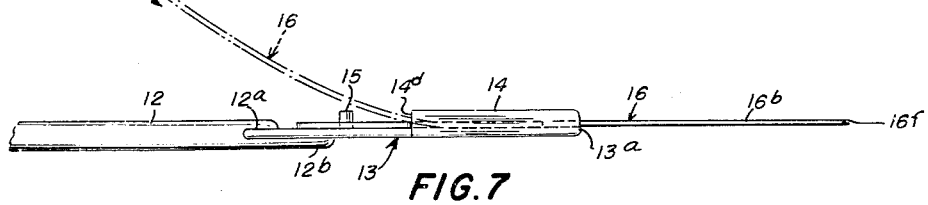
Fig. 7 is a side elevation of the anterior portion of the instrument showing the mounting and unmounting of the blade.

In Fig. 7 there is illustrated how blade 16 is slid into position in slot 14s and secured over post or pin 15.

Figure 2:
Fig. 2 is a perspective view on a slightly reduced scale to that of Fig. 1 showing the posterior end of the handle broken away and the blade member inserted between two teeth.

In operation the handle is grasped at 10 and the blade which is rounded off at its anterior end 16f is inserted between two teeth T and T', such as shown in Fig. 2. Assuming that the dentist is operating on tooth T with his high-speed dental burr, then the blade 16 would provide a barrier between the teeth T and T' and prevent the burr from accidentally contacting and cutting tooth T'. A further important feature of the instrument is that it is of such portions, delicateness and material so that whenever the rotating burr touches the blade 16b, the sensation is transmitted through the whole device to the operator's hand, which warns him to remove pressure from that area. The whole instrument is easily sterilized in its assembled condition. Replacement blades are easily inserted after the used blade is removed. The instrument has proved easy to use and has proved to be highly beneficial in operative procedures to which it admirably lends itself.

Although a preferred form of the invention has been described above, it should be pointed out that numerous modifications can be made without departing from the full scope of the invention. For example, the flexible blade member 16 may be of mirror material and the instrument may then be utilized as a mirror.

I claim as my invention:

1. A dental instrument for protecting an adjacent tooth while preparing a dental cavity in a tooth comprising in combination, an elongated handle having a transversely extending flat member at the anterior end, said flat member having a loop-like means fixedly attached and forming a slot at its anterior portion and catch means spaced posteriorly of the loop-like means, and a flexible blade received in said loop and projecting anteriorly thereof and having a posterior portion with catch means thereon cooperating with the catch means on the flat member to prevent relative movement of said blade with respect to said flat member and its loop-like means, said blade being adapted to be placed between said teeth adjacent a cavity being prepared in one of the teeth to form a barrier to movement of a dental burr against said adjacent tooth and to transmit vibrations to said handle should said dental burr strike said blade.

2. A dental instrument for protecting an adjacent tooth while preparing a dental cavity in a tooth comprising in combination, an elongated handle having a transversely extending flat member at the anterior end of a width approximately the height of a tooth above the gum, said flat member having slot means thereon at its anterior portion lying in the direction of the axis through said handle and flat member and of a width slightly less than the width of the flat member and catch means spaced posteriorly of the slot means, and a flexible blade received in said slot and projecting anteriorly thereof and having a posterior portion of a width equivalent to the width of the flat portion whereby a shoulder is formed thereon to abut the walls forming said slot to prevent anterior movement of the blade through the slot and a posterior portion on said blade having catch means thereon cooperating with the catch means on the flat member to prevent posterior movement of said blade in said slot, said blade being adapted to be placed between said teeth adjacent a cavity being prepared in one of the teeth to form a barrier to movement of a dental burr against said adjacent tooth and to transmit vibrations to said handle should said dental burr strike said blade.

3. A dental instrument according to claim 2 wherein said catch means on the flat member is an upstanding pin and wherein said catch means on the blade is an aperture adapted to be seated over said pin.

4. A dental instrument for protecting an adjacent tooth while preparing a dental cavity in a tooth comprising in combination, an elongated handle having a flat portion at the anterior end, said flat member having fixedly attached slot means thereon at its anterior portion and extending in the general direction of the axis of said elongated hande and catch means on said flat portion posterior of said slot means thereon, and a flexible blade received in said slot means of approximately three-thousandths of an inch in thickness and approximately a quarter of an inch in width, said blade having shoulder means cooperating with the edge portion of said slot to prevent anterior movement of the blade with respect to said slot and catch means for cooperation with said catch means on the flat member to prevent posterior movement of the blade with respect to said flat member, said blade being adapted to be placed between said teeth adjacent a cavity being prepared in one of the teeth to form a barrier to movement of a dental burr against said adjacent tooth and to transmit vibrations to said handle and the operator should said dental burr strike said blade.

5. A dental instrument comprising in combination, an elongated handle having a transversely extending flat member at the anterior end, said flat member having holding means spaced from one face of said flat member to form a slot portion and catch means on said one face of the flat member spaced posteriorly of said slot portion, and a mirror member received in said slot portion, lying on said one face of the flat member and projecting anteriorly thereof and having a posterior portion with catch means thereon cooperating with the catch means on the flat member to prevent relative movement of the mirror member and the flat member.

References Cited in the file of this patent

UNITED STATES PATENTS 2,400,172    Siqveland _____ May 14, 1946